United States Patent [19]

Evensen

[11] Patent Number: 4,882,699

[45] Date of Patent: Nov. 21, 1989

[54] COMMUNICATIONS NETWORK ROUTING AND MANAGEMENT SYSTEM

[75] Inventor: Mark C. Evensen, Colorado Springs, Colo.

[73] Assignee: International Business Machines Corp., Armonk, N.Y.

[21] Appl. No.: 246,477

[22] Filed: Sep. 19, 1988

[51] Int. Cl.$^4$ .............................................. H04Q 3/42
[52] U.S. Cl. .................................... 379/284; 364/300; 379/221
[58] Field of Search ............... 379/284, 280, 220, 221, 379/112, 113, 207; 364/300

[56] References Cited

U.S. PATENT DOCUMENTS

| | | | |
|---|---|---|---|
| 3,195,109 | 7/1965 | Behnke . | |
| 3,511,937 | 5/1970 | Bastian et al. . | |
| 4,068,298 | 1/1978 | Dechant et al. | 364/300 |
| 4,270,182 | 5/1981 | Asija | 364/900 |
| 4,276,597 | 6/1981 | Dissly et al. | 364/300 |
| 4,453,217 | 6/1984 | Boivie | 364/300 |
| 4,554,631 | 11/1985 | Reddington | 364/300 |
| 4,580,218 | 4/1986 | Raye | 364/300 |
| 4,595,995 | 6/1986 | Alles . | |
| 4,648,036 | 3/1987 | Gallant . | |
| 4,674,039 | 7/1987 | Chouery | 364/300 |
| 4,677,550 | 6/1987 | Ferguson | 364/300 |
| 4,742,534 | 5/1988 | Verbeek et al. | 379/284 X |
| 4,752,890 | 6/1988 | Natarajan et al. | 364/513 |

OTHER PUBLICATIONS

H. S. Stone & J. M. Stone, "Efficient Searching Technique", *IBM Technical Disclosure Bulletin*, vol. 30, No. 1, Jun. 1987, pp. 146–148.

K. S. Natarajan, T. Sakuragawa & H. S. Stone, "Adaptive Optimization of Recursive Search Trees", *IBM Technical Disclosure Bulletin*, vol. 31, No. 1, Jun. 1988, pp. 415–417.

A. L. Rosenberg & L. Snyder, "Construction of Minimal-Construction 2,3-Trees", *IBM Technical Disclosure Bulletin*, vol. 20, Jul. 1977, pp. 846–848.

Primary Examiner—James L. Dwyer
Attorney, Agent, or Firm—Earl C. Hancock

[57] ABSTRACT

A large number of potential alphanumeric patterns are ordered in a predetermined sequence which is then used to construct a transition graph composed of machine states along one coordinate and alphanumeric symbols along the other. The intersections on that graph establish either the next machine state on the graph or the action the system should provide. Pattern recognition is thus possible against strings of alphanumeric characters received thereafter by responding to the characters to determine a path of state transitions through the graph until an appropriate action indicator is reached. Machines including the invention are dynamically configurable and permit a variety of system management options to the user. The invention has particular utility for flexible configuring of the dialing plan and internal management of PBX type of telephone switching devices regardless of the pattern discipline associated with its external connections.

16 Claims, 2 Drawing Sheets

FIG. 2A.

|   | 0 | 1 | 2 | 3 | 4 | 5 | 6 | 7 | 8 | 9 |
|---|---|---|---|---|---|---|---|---|---|---|
| A |   | B |   |   |   |   |   |   |   |   |
| B |   |   |   |   |   | C |   |   |   |   |
| C |   |   |   |   |   | △ | △ | △ | △ | △ |

|   | 0 | 1 | 2 | 3 | 4 | 5 | 6 | 7 | 8 | 9 |
|---|---|---|---|---|---|---|---|---|---|---|
| A |   | B |   |   |   |   |   |   |   |   |
| B |   |   |   |   |   | C |   |   |   |   |
| C | □ | □ | □ |   |   | △ | △ | △ | △ | △ |

|   | 0 | 1 | 2 | 3 | 4 | 5 | 6 | 7 | 8 | 9 |
|---|---|---|---|---|---|---|---|---|---|---|
| A |   | B |   |   |   |   |   |   |   |   |
| B | D | D | D | D | D | C | D | D | D | D |
| C | □ | □ | □ | ◊ | ◊ | △ | △ | △ | △ | △ |
| D | ◊ | ◊ | ◊ | ◊ | ◊ | ◊ | ◊ | ◊ | ◊ | ◊ |

|   | 0 | 1 | 2 | 3 | 4 | 5 | 6 | 7 | 8 | 9 |
|---|---|---|---|---|---|---|---|---|---|---|
| A |   | B | E | E | E | E | E | E | E | E |
| B | D | D | D | D | D | C | D | D | D | D |
| C | □ | □ | □ | ◊ | ◊ | △ | △ | △ | △ | △ |
| D | ◊ | ◊ | ◊ | ◊ | ◊ | ◊ | ◊ | ◊ | ◊ | ◊ |
| E | F | F | F | F | F | F | F | F | F | F |
| F | O | O | O | O | O | O | O | O | O | O |

|   | 0 | 1 | 2 | 3 | 4 | 5 | 6 | 7 | 8 | 9 |
|---|---|---|---|---|---|---|---|---|---|---|
| A |   | B |   |   |   |   |   |   |   |   |
| B |   |   |   |   |   | C |   |   |   |   |
| C |   |   |   |   |   | △ | △ | △ | △ | △ |

|   | 0 | 1 | 2 | 3 | 4 | 5 | 6 | 7 | 8 | 9 |
|---|---|---|---|---|---|---|---|---|---|---|
| A |   | B |   |   |   |   |   |   |   |   |
| B |   |   |   |   |   | C |   |   |   |   |
| C | □ | □ | □ |   |   | △ | △ | △ | △ | △ |

|   | 0 | 1 | 2 | 3 | 4 | 5 | 6 | 7 | 8 | 9 |
|---|---|---|---|---|---|---|---|---|---|---|
| A |   | B |   |   |   |   |   |   |   |   |
| B | D | D | D | D | D | C | D | D | D | D |
| C | □ | □ | □ | ◊ | ◊ | △ | △ | △ | △ | △ |
| D | ◊ | ◊ | ◊ | ◊ | ◊ | ◊ | ◊ | ◊ | ◊ | ◊ |

|   | 0 | 1 | 2 | 3 | 4 | 5 | 6 | 7 | 8 | 9 |
|---|---|---|---|---|---|---|---|---|---|---|
| A |   | B | E | E | E | E | E | E | E | E |
| B | D | D | D | D | D | C | D | D | D | D |
| C | □ | □ | □ | ◊ | ◊ | △ | △ | △ | △ | △ |
| D | ◊ | ◊ | ◊ | ◊ | ◊ | ◊ | ◊ | ◊ | ◊ | ◊ |
| E | F | F | F | F | F | F | F | F | F | F |
| F | O | O | O | O | O | O | O | O | O | O |

△    15[5-9]
□    15[0-2]
◊    1XX
O    [2-9]XX

COMMUNICATIONS NETWORK ROUTING AND MANAGEMENT SYSTEM

FIELD OF THE INVENTION

The present invention relates to apparatus and processes for control and management of localized communications interconnection networks using data processing techniques. The invention is useful for telephone switching networks especially where such networks must interface with any of a variety of number pattern disciplines and changing system management demands. More particularly, the present invention relates to the control and management of a communication matrix for selective interconnection of communication lines, trunks and the like. The invention has particular utility for flexible configuring of the dialing plan and internal management of PBX type of telephone switching devices regardless of the pattern discipline associated with its external connections.

BACKGROUND OF THE INVENTION

The patterns, as discussed herein, are simplified forms of "regular expressions" as described in the publication entitled "*Compilers: Principles, Techniques and Tools*" by A. V. Aho and J. D. Ullman (Addison-Wesley, Reading, Mass. 1985). The dialing plan as employed in this specification is based on number patterns as opposed to area code and prefix maps. The pattern of the North American dial (NAD) plan is configured with a three digit area code traditionally formatted with the first digit, any number from 2 to 9 followed by a 0 or 1, and another digit from the 2 to 9 range. This is followed by seven digits with the first two constrained to 2-9 and the last five any digit.

When a given string of digits prescribes exactly to a given pattern, it is considered to "match" that pattern. For instance, 258 and 943 match the NAD pattern for the three digits following the area code, but 207 and 800 do not. When explicit digits are specified, only that explicit set is considered to match. That is, a number pattern of 123 is only matched by the number string 123.

Also, for patterns herein discussed, an "X" designates any digit, 0 through 9. Thus a pattern of 1X3 reflects any set of numbers of 103, 113, 123, through 193. Patterns may include selective digits, and brackets allow users to group selective digits into a single pattern element. The NAD area code could thus appear as [23456789][01]X. By using a hyphen, digit ranges are designated so that the area pattern becomes [2-9][01]X. Note that X is equivalent to [0-9]. Note also that a pattern of 2[013-9]2 means a pattern of 2 followed by any number except 2 followed by a 2.

A pattern is typically made up of pattern elements. A pattern element is either an explicit digit (an X) or a selective digits descriptor. Some of the common NAD patterns and their nomenclature are: 0—Operator; 911—Emergency; [2-9][2-9]XXXXX—Local Calls; and 1[2-9][01]XXXXXXXX—Long Distance Calls. To distinguish over the hyphen which is already used to designate ranges, element groups in a pattern are herein separated by a period or dot ("."). A local call pattern is represented by [2-9][2-9]X.XXXX. Accordingly, there are seventeen characters forming the pattern alphabet counting each end of the brackets and parenthesis as characters.

The final feature of patterns is the concept of fields which can vary from one digit to as many elements as form a pattern. Fields are delimited by a parenthesis. By convention, there is a default field for all numbers that are not enclosed within a parenthesis, field 0. In all other cases, fields within a number are numbered left to right beginning at one. If the pattern appears as ([2-9]-[2-9]X).XXXX, field one is [2-9][2-9]X and field zero is the ending XXX element.

Patterns are well suited for defining state transition tables for a fixed state machine (FSM). However, telephone systems for different applications and in different environments must comport with a variety of disciplines. The standard number patterns used in the United States, Asia and Europe all differ to one degree or another. Further, internal number patterns as with dedicated tielines, internal local network controls and the like, differ even more radically and sometimes are an adjunct to the public systems as for direct dialing of an extension which is interfaced initially via the public network number pattern.

Contemporary pattern matching involves an unacceptable degree of time complexity. That is, a character by character comparison is done against a reference pattern until a match/no match decision is made. The longer the list of patterns to compare, the more comparisons that are demanded and hence the time complexity problem. This problem is compounded where the system must handle telephone plans that have variable length prefixes. This demands a scanning of additional lists of prefixes beyond the basic pattern.

Contemporary string matching methods are efficient for small numbers of relatively small patterns such as five patterns of not more than five characters. As tables grow in size, however, the repetitive action of matching against many strings over many times grows in quadratic time. Matching by use of the present invention grows in linear time with the length of the longest, worst case pattern. This means a machine using transition and/or result tables in accordance with this invention takes exactly the same length of time for pattern recognition and response whether its transition table has one ten digit entry or a transition table with one thousand entries of ten digits each.

While tables of somewhat greater size are needed for the present invention as contrasted to string matching tables of the prior art, they still only require about 1K of data space for a reasonably complex system such as one that must recognize the general NAD plan plus eight to ten special numbers.

Some contemporary search algorithms are shown in the article by Stone et al in the June 1987 *IBM Technical Disclosure Bulletin* at pages 146–148, in the June 1988 *IBM Technical Disclosure Bulletin* article by Natarajan et al at pages 415–417, in U.S. Pat. No. 4,554,631 by Reddington, and in U.S. Pat. No. 4,580,218 by Raye. A process for constructing a search tree is described in an article by Rosenberg et al in the July 1977 *IBM Technical Disclosure Bulletin* at pages 846–848. Another searching technique concurrent with database update is described in U.S. Pat. No. 4,648,036 by Gallant. A discussion of pathfinding in a graph and a process for updating a searchable database on an ongoing basis are present in commonly assigned U.S. Pat. No. 4,752,890 by Natarajan and Stone.

Structures for performing parallel searches of stored data are shown in commonly assigned U.S. Pat. No. 3,195,109 by Behnke and in U.S. Pat. No. 4,595,995 by Alles. Apparatus for searching out free path routes through switching matrices in a manner useful for telephone system environments is taught in commonly assigned U.S. Pat. No. 3,511,937 by Bastian et al.

Typical contemporary telephone switching control systems limit the installation prospects because they are configured to work only with the public network environment of its installation. A PBX configured to interface with the North American dialing (NAD) plan cannot operate when attached to a non-NAD (eg: European) dialing pattern without substantial modification.

DISCLOSURE OF THE INVENTION

The present invention is a process for classifying and recognizing data. This is accomplished by storing prospectively receivable alphanumeric information on a data storing device and ordering that information based upon comparisons of set properties and a sort discipline which establishes the optimal order for the data. A transition graph is constructed from the ordered data with the graph consisting of a finite set of ordered states that act as a pruning process. Finally, the completed transition graph is used to develop a transition path to trace and rapidly identify matching patterns. The process also makes it possible to quickly identify that no matching pattern can exist in certain circumstances.

Further, the present invention is a process for recognizing public network numbering schemes and for handling public network restrictions using a heuristic based, low cost routing technique. Recognition of number patterns including public network numbers is obtained by pattern matching of mathematical models of regular expressions. Virtual routes are introduced as an abstraction which allows a switching network such as a PBX or the like to have an abundance of logical routes despite the number of actual, physical routes (eg: central office trunks, tie trunks, etc.). They have three attributes: a name or number representation, a physical resource or group of resources it can use, and prefix/postfix numbers.

As is apparent from the subsequent description, this invention is a tool useful to simplify routing configuration determinations as well as the handling of restrictions whether management selected or otherwise. While described in conjunction with systems for interfacing with public dialling networks, the invention is easily applied to other uses such as internal control (eg: PBX switching of direct phone lines) or private network numbering schemes such as tie lines.

Pattern matching in accordance with this invention makes it possible to allow the administrator to extend its applications for telephony purposes. For example, the administrator can stop digit outpulsing at some point and can control the protocol for outpulsing digits from the trunk. In this regard, the percent sign ("%") is used herein to designate a system preference. For example, it can establish the point in time that the system toggles from rotary dialing to direct tone multi-frequency (DTMF) dialing. The system controlling unit might respond to the presence of a % symbol by adding the preceding numbers of the element as a prefix such as for accessing a particular long distance carrier in a manner transparent to the initiating system user.

Also, the carat ("¢") signifies that the preceding digit is the last digit to the trunk. Thus numbers which match the pattern 1.408.986.XXXX¢ are limited to dialing of eleven digits total. A dialing pattern of 10288% accesses the long distance network on a local pulse trunk and then toggles to DTMF dialing once the network interface point is reached. One feature of this invention is the number recognition process which avoids the time complexity problems associated with the contemporary pattern matching systems used in prior switch control arrangements. Another feature resides in allowing the user to define number ranges making description of many schemes more concise.

Following pattern recognition and selection of an action indicator at the end of a transition graph trail, calls matching given patterns from that graph are assigned to lists of routes which can supply the required services by use of relational database techniques. The list is implicitly ordered from lowest to highest cost, and calls are routed in that order. This operation entails relatively low system overhead and integrates the concept of call restriction or management by the administrator. For instance, the administrator can impose restrictions such that international dialing routes are not available to selected user lines. Thus route assigning and system management are conceptually combined in the present invention thereby reducing the complexity for configuring and managing the system.

This invention is a flexible plan that allows users to define and route calls based on the pattern of the calls. It allows users to systematically define call types or classifications, then assign these classes of calls to logical routes and finally assign these routes to physical resources. This process follows the logical manner in which people define the routing needs.

A consequence of pattern filtering in accordance with this invention is that system administrators can group phone numbers that fit a particular pattern into named classifications. The textual reference describes the call and the service the call requires. This helps the user to simplify the configuration of the filtering/dialing plan by logically grouping calls into the same class. For instance, calls for long distance starting with a 1 and those not starting with a 1 are commonly classifiable. Specific patterns which might match a more general pattern must precede the general pattern in the recognition sequence.

The user determines the patterns that will require handling by the system. These are entered into a classification table which helps define the dialing and routing plan succinctly.

The present invention is a process for establishing the response of a controller for a communication interfacing system having a matrix of input/output connections including lines and trunks coupled thereto. Initially a list is formed in ordered sequence of the patterns of alphanumeric data which this interfacing system is expected to accommodate. A transition graph is then constructed of a finite set of ordered states based upon the sequences of elements in the patterns in the aforementioned list for defining transition paths each ending in an action indicator. Sequences of alphanumeric data received from the lines and trunks are sensed and used to follow the states of the transition graph until an action indicator is encountered.

This process can further include the step of forming a result table of system responses addressable by the action indicators from the transition table and which correlate with the type of received pattern. This table makes it possible for the system controls to determine the most appropriate system response to the received data sequences. The system response can include the step of responding to the presence of a system input pattern and a corresponding action indicator by completing an appropriate connection at the system input/output matrix, or by returning a signal to the pattern source for indicating that no system response will occur, for instance.

The result table is well suited for cost control since it also makes it possible to select the most economical trunk connection amongst a plurality of possible such connections in the presence of a valid system connection determination.

More particularly, the present invention is especially useful in a telephone switching system which has a plurality of input/output connections including communication lines and trunks along with a central processing unit coupled for sensing signals present on those lines or trunks. A switch matrix is typically connected for responding to the central processing unit by establishing appropriate interconnections between the connected lines and trunks. The invention includes a process for configuring the system to provide predetermined responses to alphanumeric input signals. This includes the step of initially composing a list of acceptable regular expressions of alphanumeric data which may appear in sequence on any given input connection. That list is ordered in a predetermined alphanumeric sequence. By inspecting each regular expression of this sequentially ordered list for sequential states, a transition graph is constructed with each transition trail ending in an action indicator. A table of system actions is then formed with each such action specifically addressable by at least one action indicator. Thereafter a response is provided to concurrence of a received regular expression and a selected system action from the system action table for selecting between completion of an input/output interconnection and other system reactions such as provision of a signal to the source of the received regular expression that the system will not complete an interconnection.

Transition graph construction in accordance with this invention starts with an ordered sequence of patterns which are anticipated as receivable by the controller. The graph is formed by a series of correlations of receivable characters from the pattern alphabet. An initial state is established and action indicators placed at each state to character intersection. The action indicators may comprise matched pattern symbols, next state directors, or indications that it is not possible to reach a match for the pattern under consideration at the time.

Those having normal skill in the art will recognize the foregoing and other objects, features, advantages and applications of the present invention from the following more detailed description of the preferred embodiments as illustrated in the accompanying drawings.

DETAILED DESCRIPTIONS OF THE PREFERRED EMBODIMENTS

Figures 1, 3:
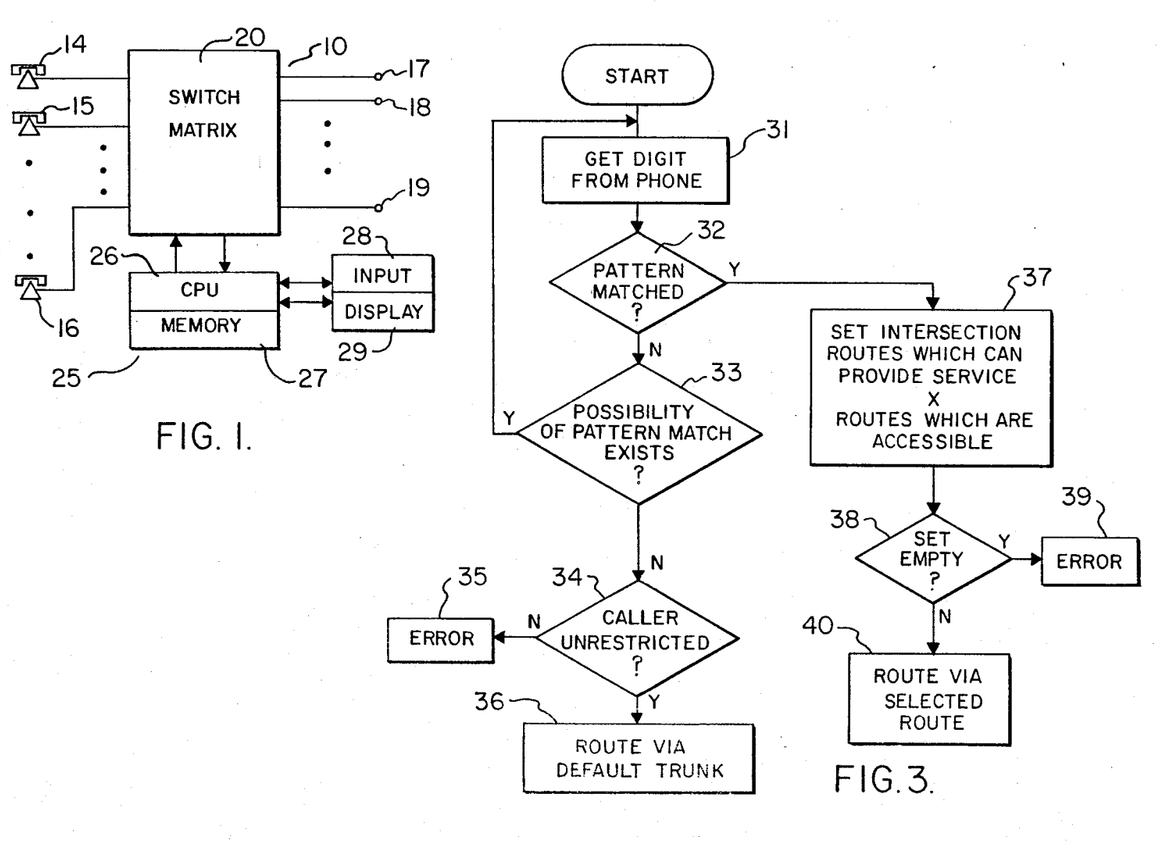
FIG. 1 is a block diagram of a PBX type system which can implement the present invention.
FIG. 3 is a flow chart of the operational environment of the present invention.

The present invention is described herein in conjunction with a hybrid key/PBX product along the lines of switching system 10 shown somewhat schematically in FIG. 1. This system supports an array of entry level users shown as telephones 14, 15 and 16. A hybrid key/PBX product 10 provides the features of a key telephone such as access to more than one extension through the use of buttons on telephones and features common to a PBX such as communications between internal phones 14-16 and external networks 17, 18 and 19. By way of example, external input/output connection 17 might represent a CO trunk, connection 18 a special service trunk (eg: MCI Prism, etc.) and connections 19 private tielines.

A conventional switching system 10 includes an appropriate switch matrix 20. Matrix 20 is both monitored and controlled by an interface with a controller/computer 25 which includes a central processing unit 26, a memory 27 which typically includes RAM and satellite data storage, and an interface with the user as via input device 28 and output display 29. In addition to conventional network switching, system 25 can handle a variety of functions such as data/voice integration, voice message support, system management control, analog attachment support and system maintenance.

The present invention is a process that improves system 10 performance by recognizing and classifying data in an efficient, real time manner. Data is searched in parallel using a plurality of search patterns that can match information without increasing the system execution time for the search.

The process of this invention recognizes and classifies input data quickly. It makes it possible to search for a large number of different patterns simultaneously regardless of the number of patterns which the search can handle at the same time. The process could have applications in the telecommunications industry (ie: dialing and phone feature control), digital signal processing (ie: recognition of samples), and database management systems (ie: search and retrieve).

Preferably alphanumeric data defining the pattern strings which it is desired to have system 10 employ as standards for matching purposes are initially entered by the user as by keyboard entry at input 28. This data is stored in memory 25. The CPU 26 then uses a sorting algorithm based upon comparisons of set properties and a pseudo language sort description to arrange the entered data in an optimal fashion for the ultimate match searching process.

Upon completion of the sorting procedure, CPU 26 then operates on the thus ordered data to construct a transition graph. As is apparent from the subsequent description, this graph is created by assembling a finite set of ordered states. The transition graph makes it possible to prune the transition paths followed in the search process. As alphanumeric data is received from the input/output devices 14-16 and/or 17-19, controller 25 performs pattern recognition searching by following a transition path determined by the received data in sequence and the transition graph states. This results in either a recognized pattern or a decision that it is not possible to recognize a pattern. System controller 25 can then determine the appropriate system response.

Routes are conceptualized as virtual trunks. A route has several properties including text name, a physical resource or group of physical resources to which it is assigned, and some special properties. One of the special properties that a logical route has is number pre/post fixing. One example of this is a long distance carrier connection which may have an access number followed by the toll number and an account code. The user 14-16 dials the toll number but the PBX controller 25 adds the prefix access number and the postfix account number for outpulsing onto one of trunks 17–18.

By default, there are as many logical routes as there are pattern classifications. Users can create routes to service various types of service requests. Local calls are routed to CO trunk 17 as might long distance carrier calls. Where multiple routes are possible as where WATS lines, leased tielines 19, special high quality lines 18 or other special trunks are available, the user can order the sequence of call routing from least to most expensive. Conversely, the user can disallow any calls by not assigning a route to the classification of the related pattern.

For purposes of semantic consistency, the pattern description table is preferably configured first. Each pattern name appears exactly once in the leftmost column. By default, each pattern is assigned to a logical route which shares the same name. For instance, if the user configures a pattern that is named "Local Call", by default a "Local Call" is assigned to a logical route named "Local Call". By supplying an ordered list of possible routes on the right side of the configuration menu, the user lists the logical routes which may function to fulfill that request. For example:

| Class Description | Route Name |
| --- | --- |
| Default: | |
| Long Distance | Long Distance |
| Disallow: | |
| Long Distance | |
| Cost Ordered: | |
| Long Distance | Cheapest Carrier |
| | More Expensive Carrier |
| | Most Expensive Carrier |

From the above, it is readily apparent that it is possible to automate the function of ordering routes based on cost. In that case, the user need only enumerate the possible routes for each call class and the system 25 can order interconnections on a cost basis taking into account factors such as tariffs, time-of-day/day-of-week data, etc.

Route profiles to describe access permissions can further enhance system management. A route profile is a list that enumerates the access to logical routes authorized for the user with a given profile and generally are configured as allow or deny entries. The classifications are textual and descriptive of the type of service requested. With the type of service summarized, the system controller 25 decides how to best fulfill the requested service. When it is known that the the request is serviceable, controller 25 must determine if the requestor is allowed to make the call. The toll restriction profile of the caller is used to make that decision. Once the call is free to use a logical route, the availability of the physical resource determines when the call is actually placed.

The state transition table is arranged so that vertical columns correspond to the possible system input digits. While inclusion of a hangup key, asterisk key and pound-sign key is possible, they are generally omitted herein for transition table construction. The horizontal rows correspond to the finite states of the match searching. Entries to the table are presumed zero initially. The machine bases its transitions on a combination of its current state and the input it receives. Put another way, the table identifies the next machine state to the machine based on the current state of the machine and its current input. If entry for a given state on a given input is undefined, the result is an error. Semantically, undefined errors mean that the machine cannot recognize the input pattern.

A second table contains entries which classify the recognized transition strings from the transition table. Zeroed entries signify that the machine has not yet recognized a pattern. In contrast to the state transition table, zeroed out entries in this result table are not errors. A non-zero entry in this table means a pattern is recognized. This table is referred to as the result table meaning it is keyed to the results of following a transition path through the transition graph.

A general convention in building a transition table is, if something is already entered for a state and number intersection, do not change it. It is acceptable to follow an existing path and add new transitions as long as the existing path is not modified. The assignment of states is done on the basis of depth first, left to right ordering. Entries in the state transition table which are set to the first state cause the machine to assume its initial state. This occurs in the transition table at a point where a pattern is recognized and the machine is reset by default. All entries in the result table correspond to locations of these reset transitions in the transition table. By flagging entries as classification entries (perhaps setting one bit on or off), it is possible to merge the two tables.

The patterns used in this process are simplified forms of regular expressions. Input data and the patterns that describe that data are a finite and enumerable set constituted of an alphabet similar to that discussed previously herein. Each member of that alphabet has a unique and singular machine representation. The algorithms are independent of a particular character set, and any of the contemporary character encoding schemes (eg: ASCII, EBCIDIC, BCD) fulfill this requirement.

Each pattern is composed of a finite, positive number of elements and is terminated by an end-of-string (EOS) delimiter. There is no provision for recognizing a zero length pattern. Each element within a pattern is configured as mentioned previously and has an index which is assigned in a left-to-right, ascending fashion. As is conventional, concatenation is shown by juxtaposition of elements.

In pattern ordering, one difficulty resides in the fact that sometimes two patterns might conflict. That is, a given input datum or data set could correctly match two or more patterns. Using conventional string matching processes, the only way to disambiguate the conflict is often to generate an equivalent set of at least as many patterns. The heuristic used to disambiguate herein is to assume that, if patterns overlap, the pattern with fewer matching data strings takes precedence. For example, given the patterns 123 and XXX, the pattern 123 is recognized to comprise smaller total coverage of the possible input data and will therefore take precedence.

Pattern ordering herein preferably is carried out using a sorting algorithm based on comparisons of set properties as opposed to using number properties. An important consideration when choosing the sorting technique is that the set operations and relations used to order the patterns are not transitive. The properties of transitivity and implied ordering are used in most popular O(n log 2) sorting algorithms. The sorting method chosen for these purposes is a fully ordered sort (eg: bubblesort). Appendix A below contains a pseudo language sort description. The key to the algorithm lies in the semantics of the operator ">". The following defines the relationship between the nth element of any two patterns:

Congruent: The two elements identify equal sets of alphabetic symbols. Example 4XX and 4XX are congruent.

Disjoint: The intersection of the two sets identified by the two elements is the empty set. For example, 4XX and 5XX are disjoint elements.

Superset: The set defined by the first element contains the set defined by the second element. As defined here, mathematicians will recognize notation of a superset as the definition of a proper superset. By way of example, [6-9]XX is a superset of 7XX, or, conversely, 7XX is a subset of [6-9]XX.

Intersecting: The set defined by the second element contains some of the set defined by the first element. For example, [4-7]XX and [6-9]XX intersect (at both 6 and 7).

In some cases, the set of inputs which are matched by two patterns will intersect while neither set is wholly contained in the other. It is possible to introduce the notion of one set that is more contained within another set but for practical purposes this is a rare circumstance and, if a distinction is needed, this pattern disambiguity is resolved manually. The index counts elements within the pattern, not characters, because a range may contain many characters even though it only defines one element for pattern comparison purposes.

A transition graph consists of a finite number of states. States in turn are an indexed collection of one or more transition points. An index is selectable from any valid symbol of the acceptable input alphabet. For any state, a given index may identify either one or zero transition points within that state. Thus a state is an indexed collection of transition points with the indexing based on the input alphabet.

Each transition point has a mode. This transition point mode will determine whether there is an associated classification tag or next state. The two attributes of "next state" and "classification tag" are mutually exclusive; a transition point is assigned one or the other but not both.

It is possible to construct a transition graph using a brute force, straightforward approach wherein each digit and state are individually and sequentially addressed. However, this is not necessarily preferable as it may result in an algorithm considered mathematically intractable in the general case. That is, the transition graph construction may require an inordinate amount of computer time to complete. This is resolved by employing pruning techniques.

For example, the brute force approach to a [3-9]XXX pattern may demand consideration of 800 individual patterns. However, by employing pruning techniques, this resolves to only four states and 38 intersections. In addition, there is potential commonality with other patterns such as [2-9]XXX. Still further, there are some optimization techniques or algorithms that permit reduction of the number of states in the transition graph table once it is constructed.

The publication entitled *The Art of Computer Programming III: Sorting and Searching* by D. E. Knuth (Addison-Wesley, Reading, Mass. 1973) can prove a helpful reference for the person implementing the present invention.

Appendix B below is a pseudocode description of the make_graph procedure. The procedure is recursive and, as previously mentioned, uses pruning techniques to eliminate redundancy. In order to apply the first pruning technique, the following are prerequisites: (1) the current element of the pattern must denote at least two symbols of the input alphabet, and (2) the transition points on the symbols in question or under consideration must not exist.

The second pruning rule prerequisites are: (1) the current element of the pattern must denote at least two symbols of the input alphabet, (2) the transition points on the symbols in question must exist (due to a previously constructed path of an overlapping pattern), and (3) the transition points' modes are "continue" and the next state values for these points must agree. If two transition points are equivalent and at least one symbol denoted by the current element was evaluated (implied by the symbol's existence in set'), then continued evaluation of the current symbol is redundant.

There are some optional transition graph construction steps to optimize the graph once it is built. These steps are consistent with the generally accepted methods for optimization of finite automaton transition graphs. One class of optimization methods known as equivalent state elimination will resolve backwards from final, or stop mode states. In this regard, see "*Introduction To Automata Theory, Languages, and Computation*" by Hopcroft and Ullman (Addison-Wesley, Reading, Mass.).

In practice, the transition graph is preferably constructed as a table. A class of techniques which will eliminate null transition points from states can prove useful in reducing the space absorbed by a table. For an example of such a reduction technique, see Aho et al's "Compilers: principles, Techniques, and Tools", supra.

A simplified case of building a transition graph is illustrated sequentially in FIGS. 2A, 2B, 2C and 2D. These graph building steps assume that the four patterns of 15[5-9], 15[0-2], 1XX and [2-9]XX are the patterns which the user entered for recognition when they are received. It is also assumed they are ordered in the aforementioned sequence.

Figure 2A:
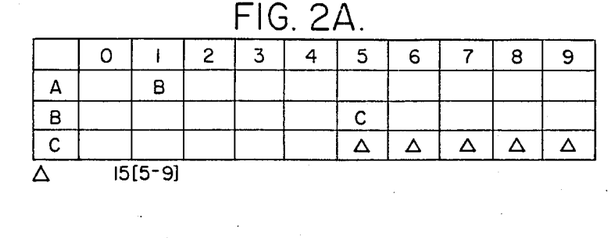
FIGS. 2A-2D is an illustration of construction of a transition graph.

FIG. 2A deals with the first pattern, 15[5-9]. The first entry into the transition graph is to indicate that when a 1 is received while the system is in the initial state A, the investigation shifts to state B where it will look for the next acceptable digit. Since only a 5 is acceptable for this pattern, the table is noted for a shift to state c when the 5 is detected as a second character of this element. Detection of any of the characters 5 through 9 satisfies the C state and this is reflected by entry of a triangle for each of their C state intersections. That is, reaching of a triangle action indicator informs the system that a valid 15[5-9] pattern was received.

Figure 2B:
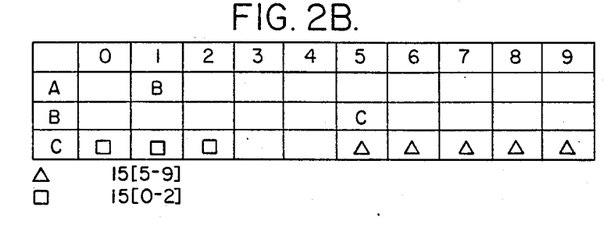

Expanding the transition table to accommodate the next acceptable pattern in the ordered sequence, namely 15[0-2], is shown in FIG. 2B. Here, the 1 and 5 are the first two characters of this element or pattern which is redundant with the FIG. 2A pattern. Therefore there is no change in the A and B state levels. However, in the B level, only 0, 1 and 2 are valid for the third character of this second pattern. Accordingly, a square is entered in the transition graph for level C under 0, 1 and 2.

Figure 2C:
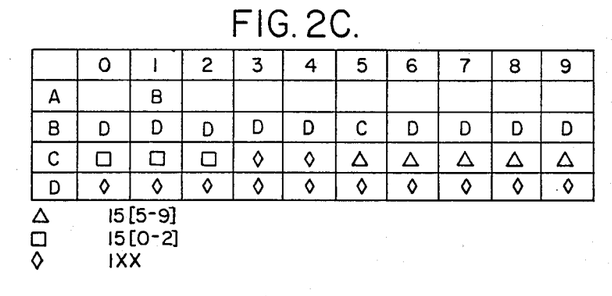

Next a 1XX pattern is entered into the transition graph as represented by FIG. 2C. The first character is common with the first two patterns entered and thus level A is unchanged. However, any digit is valid for the second character of this pattern so, in addition to the C level director under 5, a D level is created and it is indicated for 0-4 and 6-9 at state B. A valid third character of 1XX is also any digit so a diamond is entered for every digit intersection with the D state.

Figure 2D:
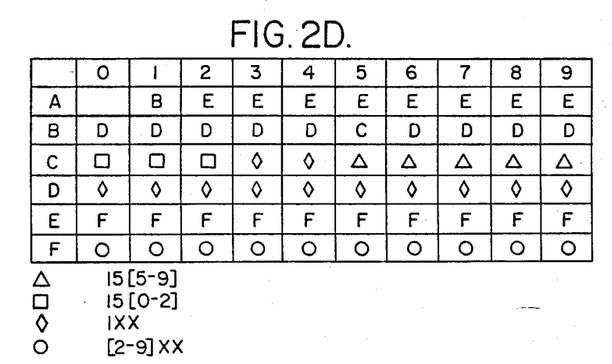

Finally, FIG. 2D shows the transition graph building for the last valid pattern [2-9]XX. This recognizes all the digits received other than 0 or 1 are valid for the first character of the fourth pattern. Since these are not common with any valid first character for the three preceding patterns, a new state E is created. State E reflects that any digit is valid for the second character and references state F to handle the third character of this pattern. Note that any digit is valid for the third character of the fourth pattern so state F includes a circle for every possible digit intersection.

If FIG. 2D were the final transition graph configuration, it would cause a response indicating that a valid pattern was received and recognized for any sequence of three digits except one that started with a zero. In this latter case, the system receives a signal indicative that no valid, recognizable pattern is present. Accordingly, an almost immediate response is provided by following any transition path through the transition graph, and the system controller such as CPU 25 can respond accordingly. Pattern recognition is the final goal of this invention. It is also the simplest and fastest of the algorithms described. All of the intelligence required to recognize patterns is encoded in the transition graph built during the make__graph procedure. All the pattern recognizer does is trace the transition graph path until an action indicator is reached. That is, a pattern recognizer traces the transition graph path, following the transition points, until either of two circumstances occur. First, it may arrive at a state with no transition defined for the current input symbol. The recognizer action indicator in this case is an error value which indicates that the input cannot ever match a valid pattern. Secondly, it arrives at a state with mode stop. The recognizer returns the classification of the transition point. Appendix C below is an example of a pattern recognizer expressed in pseudo code.

FIG. 3 is a flow chart of the basic pattern recognizer procedure in a simplified sense. As digits 31 are received as by origination at a user phone 14-16, the CPU 25 begins inspecting the action indicator associated with each state/digit intersection in sequence for the purpose of rendering a pattern match decision 32. If an indicator of a valid pattern is not reached at that intersection (ie: a triangle, square diamond or circle is not encountered), the system inspects the next received digit.

Note that, if a pattern is not matched but the possibility of a matching pattern does not exist (ie: a 0 is received as an initial or state A first pattern character in conjunction with the FIG. 2D transition graph), then either an error is flagged or a default trunk is selected if the user is unrestricted. That is, at decision block 33, the question is asked: If the user dials more digits, is it possible that these digits could complete a valid pattern?

If the encountered state/digit intersection shows a valid pattern is matched, action block 37 is invoked wherein the appropriate switching matrix is actuated so that routes to provide the requested service are enabled. Decision 38 responds to a lack of an available route because the set is empty by generating another error signal 39 which is logically different from error signal 35 as far as the system controller response is concerned.

Note that, in following the transition paths of FIG. 2D, exactly the same length of time is required to reach a logical decision that any one of the four valid patterns is present at the input. Reference to a single table accommodates pattern recognition searching for all of those patterns despite overlap. Comparison with a stored pattern for each of the four is avoided as the prior art approaches would dictate.

The following are the three Appendices A, B and C as mentioned previously herein. They all utilize conventional pseudo code notation and are self explanatory.

APPENDIX A

SORT ENTRIES

```
infix function > (pattern__a, pattern__b : pattern ) : boolean;
type
relation__type is ( disjoint, intersection, congruent,
superset );
var
relation : relation__type;
index : element__index;
begin
relation := congruent;
index := 1;
while pattern__a[index] < > EOS and pattern__b[index] < >
EOS and relation = congruent do
begin
set__a := convert__element__to__set( pattern__a[index]);
set__b := convert__element__to__set( pattern__b[index]);
index := index + 1;
if set__a = set__b then
relation := congruent
else if set__a * set__b = [] then
relation := disjoint
else if set__a − set__b < > [] then
relation := superset
else
relation := intersection
end;
return relation = superset; (* boolean evaluation *)
end;
    procedure order__patterns( var patterns : array of pattern;
                        num__of__patterns : 1..maxint );
begin
for i := 1 to num__of__patterns − 1 do
for j := i + 1 to num__of__patterns do
if pattern[i] > pattern[j] then
swap( pattern[i], pattern[j]);
end;
```

APPENDIX B

TRANSITION GRAPH MAKING PROCEDURE

```
procedure makegraph ( var state : state__types;
                    pattern : pattern__type;
                    classification : classification__type;
                    index : element__index );
var
set, set':                    set__type;
next__state :                 pointer to state__type;
new__point, already__done :   boolean;
i, j :                        symbol__type;
set := convert__element__to__set( pattern[index]);
index : index + 1;
next__state := 0;
set' := [];
for i in set do
if state[i] exists then
new__point := false;
else
new__point := true;
create( state[i]);
if pattern[index] = EOS then
state[i].mode := stop;
state[i].classification := classification;
else
state[i].mode := continue;
fi
fi
```

APPENDIX B-continued
TRANSITION GRAPH MAKING PROCEDURE

```
if state[i].mode <> stop then
  if new_point then
    if next_state: = 0 then
      next_state := allocate_new_state();
      state[i].next_state ;= next_state;
      makegraph( state[i].next_state, pattern, classification,
        index);
    else
      state[i].next_state := next_state;
    fi
  fi
  else
    already_done := false
    for j in set' do
      if state[j].next_state = state[i].next_state then
        already_done := true;
      fi
    rof
    if not already_done then
      makegraph( state[i].next_state, pattern, classification,
        index);
    fi
  fi
  set := set − i;
  set' := set' + i;
  rof
end;
procedure main( patterns : array of pattern);
  order_patterns( patterns);
  index:= 0;
  while pattern[index] <> EOL do
    make_graph( initial_state, pattern[index], index, 0);
  elihw
end;
```

APPENDIX C
PATTERN RECOGNITION

```
function find( var input : stream;
              initial_state : transition_graph ) : integer;
  current_state := initial state;
  loop
    get( symbol, input); /* pull a symbol off the input stream */
    if exists current_state[symbol] then
      if current_state[symbol].mode = stop then
        return current_state[symbol].classification
      else
        current_state := current_state[symbol].next_state
      fi
    else
      return error
    fi
  pool
end;
```

Although this invention is described in terms of a process, it is suitable for implementation in hardware if desired. However, the flexibility is probably best realized by entry into a data processing type of controller. Further, while the exemplary preferred embodiments of the present invention are described herein with particularity, those having normal skill in the art will recognize various changes, additions, modifications and applications other than those specifically mentioned herein without departing from the spirit of this invention.

What is claimed is:

1. A process for classifying and recognizing data comprising the steps of
    entering alphanumeric information and storing it on a data storage device,
    ordering the alphanumeric information based on a predetermined sequence of sets and comparisons of set properties,
    constructing a transition graph from the ordered alphanumeric information that consists of a finite set of ordered states wherein each state has a defined transition point for every potential alphanumeric information character, and
    developing a transition path in the transition graph from the initial state to each subsequent state to trace and identify matching patterns from unknown sets of discrete alphanumeric information.

2. A process for classifying and recognizing unknown strings of data comprising the steps of
    compiling a group of alphanumeric patterns for which recognition is desired and wherein each said pattern is comprised of a plurality of characters,
    ordering said patterns in a predetermined sequence based on comparison of set properties,
    constructing a transition graph composed of a finite set of ordered states indexed to the alphabet of characters contained in said compiled and ordered patterns with each state to character intersection containing a defined transition point, and
    responding to receipt of an unknown pattern by tracing the transition path through said transition graph to determine whether said unknown pattern matches at least one of said compiled and ordered patterns.

3. A process in accordance with claim 2 wherein said ordering step includes the step of resolving ambiguities wherein an unknown pattern could match two compiled patterns by ordering the pattern having the probability of a lesser number of prospective matching patterns ahead of the pattern having the probability of a greater number of prospective matching patterns.

4. A process in accordance with claim 2 wherein said constructing step includes the step of assigning to each transition point either a classification tag reflecting the termination of a transition path or a next-state indicator identifying the next state for comparison against the next character in the unknown string.

5. A process in accordance with claim 4 wherein said assigning step includes the step of marking any state to character transition point which corresponds to recognition of a valid matching pattern with a special symbol for identifying the matched pattern.

6. A process in accordance with claim 5 wherein said assigning step further includes the step of marking any state to character transition point which cannot occur for a valid matchable pattern with a special symbol for terminating any subsequent matching search.

7. A process in accordance with claim 2 which further includes the step of generating a signal identifying the action corresponding to the result of a favorable match of a pattern by said responding step.

8. A process for establishing the response of a controller for a communication interfacing system having a matrix of input connections including lines and trunks coupled thereto comprising the steps of
    forming a list in ordered sequence of the patterns of alphanumeric data which the interfacing system will accommodate,
    constructing a transition graph of a finite set of ordered states based upon the sequences of elements in the patterns in said list for defining transition paths each ending in an action indicator, and
    sensing sequences of alphanumeric data received from the lines and trunks by following said states of said transition graph until an action indicator is encountered.

9. A process in accordance with claim 8 which includes the step of forming a table of system responses addressable by said action indicators in accordance with the type of received pattern so as to determine the appropriate system response to the received data sequences.

10. A process in accordance with claim 9 which includes the step of responding to the presence of a system input pattern and a corresponding action indicator by completing an appropriate connection or by returning a signal to the pattern source for indicating that no system response will occur.

11. A process in accordance with claim 10 wherein said responding step includes the step of selecting the most economical trunk connection in the presence of a valid system connection determination.

12. In a telephone switching system having a plurality of input/output connections including communication lines and trunks and with a central processing unit coupled for sensing signals present on the lines or trunks and with a switching means connected for responding to the central processing unit by establishing appropriate interconnections between the connected lines and trunks, a process for configuring the system to provide predetermined responses to alphanumeric input signals comprising the steps of composing a list of acceptable regular expressions of alphanumeric data which may appear in sequence on any given input connection, ordering said list in a predetermined alphanumeric sequence, inspecting each regular expression of said sequenced list for sequential states for constructing a transition graph with each transition graph trail ending in an action indicator, forming a table of system actions with each said action specifically addressable by at least one said action indicator, and responding to concurrence of a received regular expression and a selected system action from said table for selecting between completion of an input/output interconnection and provision of a signal that the received regular expression will not cause the system to complete an interconnection.

13. A process for constructing a transition graph for a communication managing system which employs a data processing controller including a data memory device and wherein said system must recognize the receipt at any of a multiplicity of input connections of signals in a plurality of data patterns each composed of a discrete sequential string of characters of a predetermined alphabet of characters and symbols and wherein said prospective patterns are known in advance and identified in a predetermined hierarchical list comprising the steps of (a) establishing an initial transition graph state with an intersection with each potential character of said alphabet, (b) inspecting the first character of the first pattern in said list to assign a first or second action indicator to every said intersection where a valid pattern character can occur with said first action indicator reflects that a valid pattern is recognized and said second action indicator reflects that consideration of a subsequent transition graph state is required, (c) forming a subsequent state with an intersection with each potential character of said alphabet, (d) performing a second said inspecting step beginning with said initial state for the second character of the first pattern for assigning an action indicator to any intersection which does not have a previously assigned such action indicator, (e) repeating said inspecting, forming and performing steps sequentially for all remaining characters of said first pattern with each said inspecting step commencing with said initial state, and (f) recycling said steps (a) through (e) in sequence for each pattern of the hierarchical list commencing with said initial state established in step (a), whereby the system can simultaneously search for matches between any pattern in the hierarchical list and any pattern received at a system input connection.

14. A process in accordance with claim 13 which includes the steps of following said step (f) with the step of locating any state to character intersection which has no assigned action indicator to insert a third action indicator for reflecting that pattern matching cannot occur, and storing the thus completed transition graph in the system data memory device.

15. A process in accordance with claim 14 which includes the steps of defining a unique symbol for each respective pattern of the hierarchical list, and employing the defined symbol for the first action indicator when processing the graph construction steps for the corresponding pattern.

16. A process in accordance with claim 15 which includes the step of forming a table of the defined symbols in conjunction with system responses to existence of the recognized pattern whereby retrieval of a given unique defined symbol from the table will cause the system to automatically respond in a predetermined manner.

* * * * *